*INVENTOR*

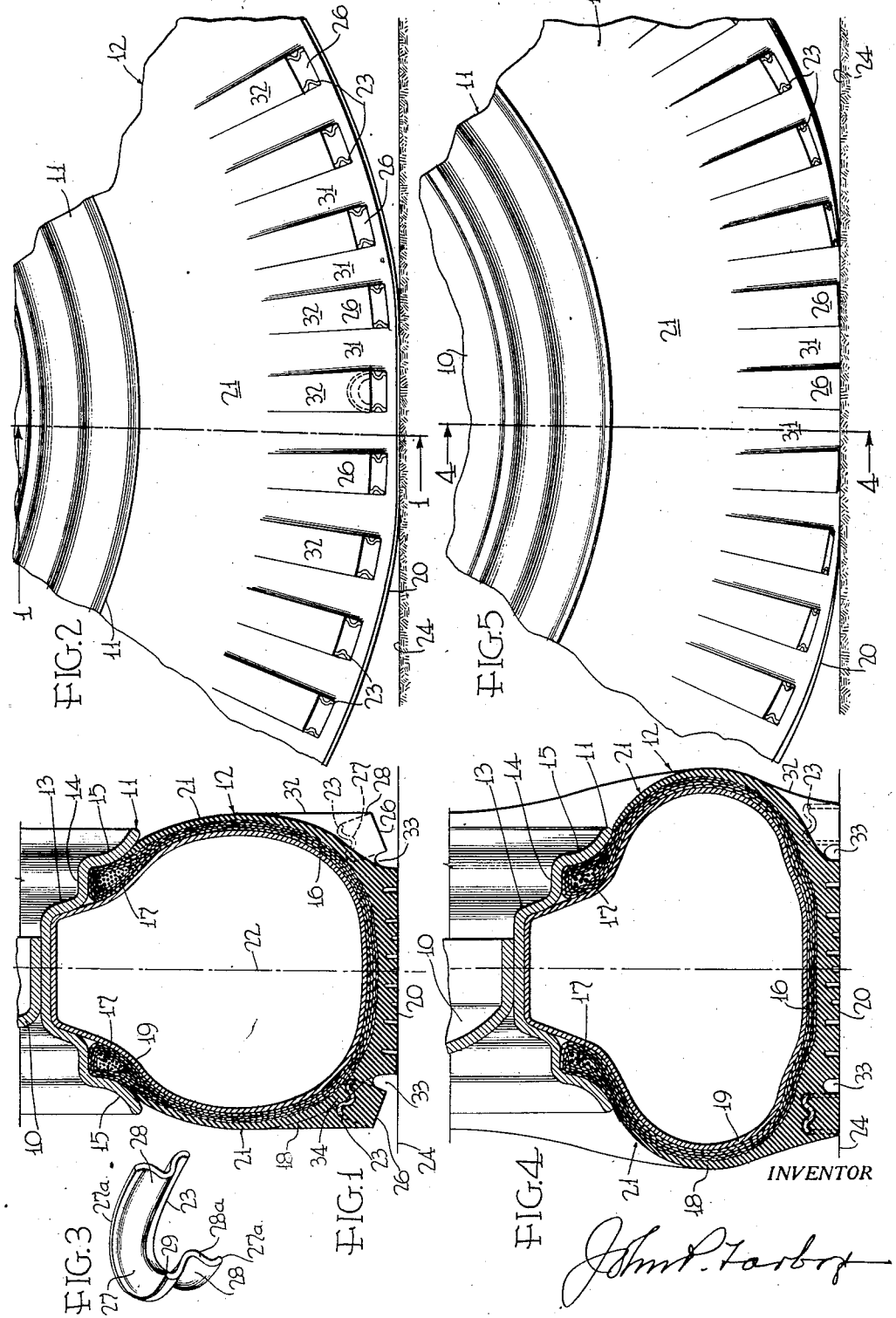
Aug. 1, 1944.     J. P. TARBOX     2,354,715
ALL-WEATHER TIRE
Filed Aug. 19, 1940     4 Sheets-Sheet 1
INVENTOR Aug. 1, 1944.   J. P. TARBOX   2,354,715
ALL-WEATHER TIRE
Filed Aug. 19, 1940   4 Sheets-Sheet 2
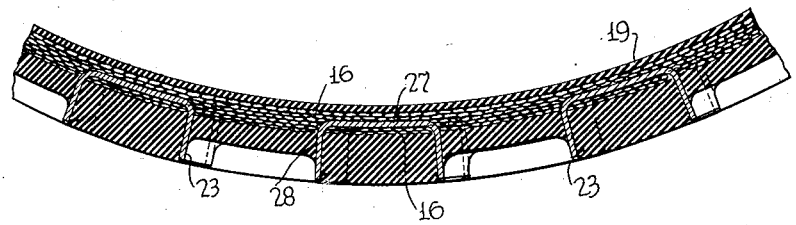
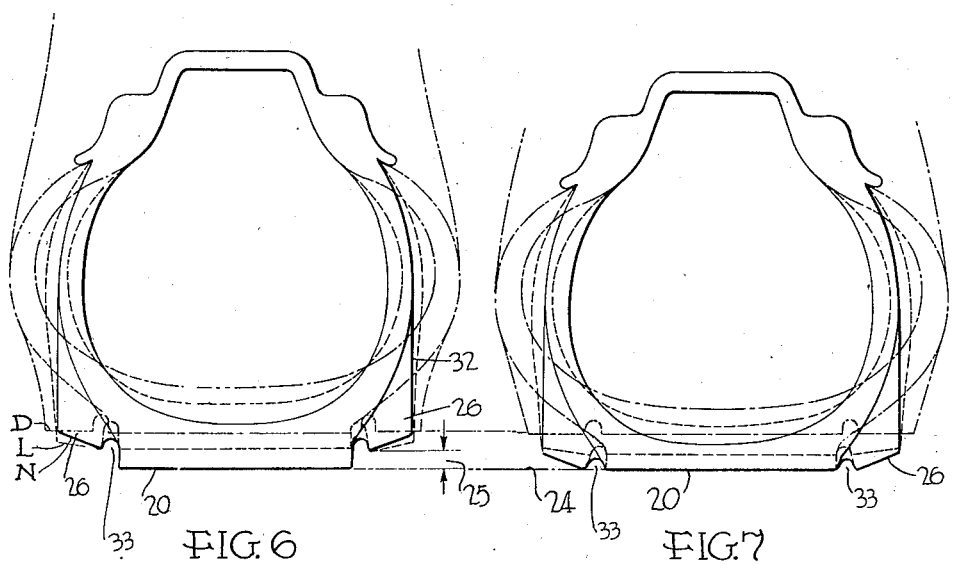
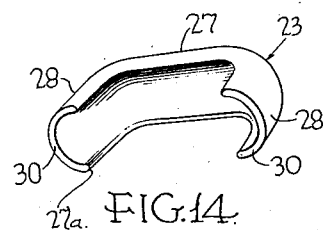
INVENTOR Aug. 1, 1944.　　　J. P. TARBOX　　　2,354,715
ALL-WEATHER TIRE
Filed Aug. 19, 1940　　　4 Sheets-Sheet 3
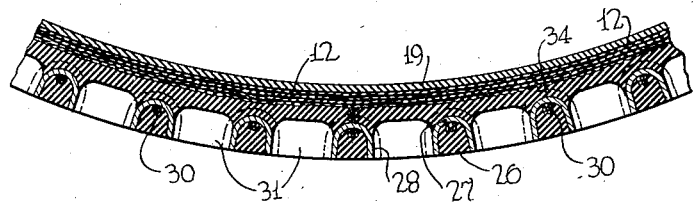
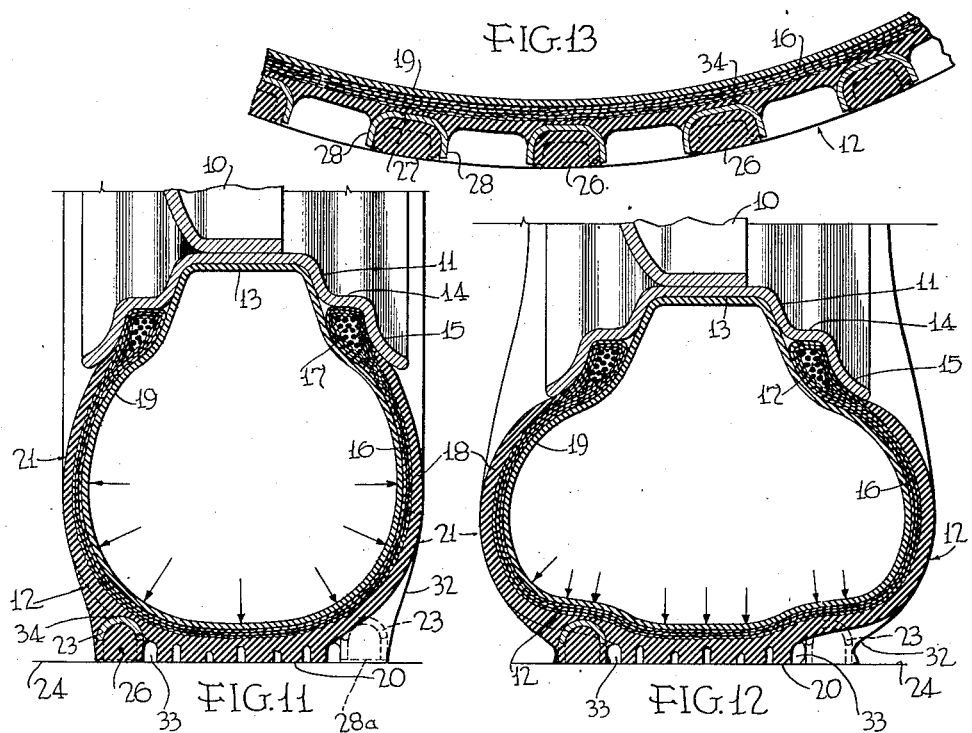
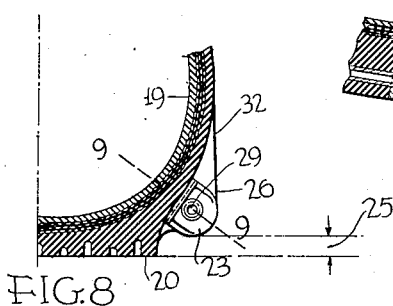
INVENTOR Aug. 1, 1944.  J. P. TARBOX  2,354,715
ALL-WEATHER TIRE
Filed Aug. 19, 1940  4 Sheets-Sheet 4

Patented Aug. 1, 1944

2,354,715

UNITED STATES PATENT OFFICE 2,354,715

ALL-WEATHER TIRE

John P. Tarbox, Philadelphia, Pa.

Application August 19, 1940, Serial No. 353,167

6 Claims. (Cl. 152—211)

My invention has to do with the attainment of an all-weather tire.

It has heretofore been proposed to obviate the necessity for non-skid chains and the like attachments to a tire applied during the prevalence of adverse weather conditions to prevent skidding, by incorporating non-skid abrasive material in the rubber of the tread, and by incorporating in the tread in general metallic members which engage the roadway under all conditions or under certain skidding conditions.

According to my invention I provide in the tread a distance laterally of the plane of symmetry of the tire (or of its medial plane in case it should not happen to be symmetrical), an annular series of metallic saddles extending from the ground face of the tread radially of the tire toward its carcass, and so located in position between the plane of symmetry (or the medial plane) of the tire and the tire side walls as to serve as fulcrums over which, when the tire is deflated below normal pressure to such an extent that the side walls extend to a materially greater extent than normally beyond the saddles laterally, a considerable part of the ground load, which under normal inflation pressure is carried by that portion of the tread between the saddles and the plane of symmetry, is imposed upon the saddles whereby the saddles are caused to engage the surface of the roadway with a stronger grip or bite therein, so as to afford the increased traction desired.

Through this construction I carry out a method which is at the foundation of my invention. It is that method of changing the tread of a tire from skid condition to non-skid condition which consists in providing the tread of the tire intermediate the plane of symmetry of the tire and its side walls with an annular series of relatively inflexible saddles extending from the tread face toward the carcass of the tire, but of such lateral extent and arrangement as normally not to cause the annular zone in which they lie to assume a substantially greater ground load per square inch than the annular zones which flank them during normal inflation of the tire, thus affording a skid tread, and when it is desired to achieve a non-skid tread, deflating the tire to such a considerable extent as to fulcrum the carcass upon the rigid saddles to a degree sufficient to cause the zone in which they lie to assume an increase in its ground load per square inch from twenty (20) to sixty (60) percent.

This method and construction are a radical departure from those methods and construction in which the roadway surface is engaged all the while, only under a limited number of skid conditions by abrasive materials or metallic devices incorporated in the tread, and all the engagement is under substantially the same pressure per square inch. While the complete fullness of the departure cannot be appreciated until the invention is understood in its details through the following disclosure of several of its embodiments, two outstanding things should be very clear from this preliminary statement. The first is that the saddle elements, through which the conversion from skid to non-skid condition is effected, are not fully effective when the tire is under normal inflation under any condition of the roadway surface in any weather, and are susceptible to being rendered much more highly effective. This is a radical departure. The second outstanding feature is that the degree of effectiveness of the incorporated devices under all the variations of weather and roadway conditions is controlled by simply deflating and inflating the tire. While deflating the tire to increase traction on snow or ice is a well-known expedient among automobile drivers, this feature of my invention is nonetheless radical because according to my invention I utilize this changing of the tire inflation pressure not merely to increase tread area, but outstandingly to create a differential of tread pressure per square inch in favor of chosen portions of the tread, portions rendered capable of effectively making use of the increased pressure to increase the grip per square inch on the roadway.

A great number of ancillary objects, features, and advantages will appear in the course of a full disclosure.

Figures 1 to 5 are illustrative of an embodiment of my method and construction in which all portions of the width of the tire tread do not engage the surface of the roadway under normal conditions at one and the same time under normal inflation pressure, but all portions of which may be made to do so by considerably reducing the normal inflation pressure, and of these figures—

Figure 1 is a transverse cross-section of the tire showing its roadway engagement under normal inflation pressure;

Figure 2 is a side elevation showing the roadway engagement under the same pressure;

Figure 3 is a detailed perspective of one of the metallic saddles used in this construction;

Figure 4 is a transverse cross-section of the same tire showing the roadway engagement of the tread when the inflation pressure has been considerably reduced; and Figure 5 is a side elevation showing this roadway engagement under considerably reduced inflation pressure.

Figures 6 and 7 are diagrams showing, respectively, the behavior of the tire and method of the embodiment of Figures 1 to 5 when the tire is new and the tread is thick, and when the tire is old and the tread is thin.

Figures 8 and 9 are, respectively, a transverse cross section and an annular cross section on line 9—9 of Figure 8 of a modified form of the embodiment of Figures 1 to 5, the modification being principally in the form of saddles and their incorporation in the tread.

Figure 10, appearing on the same sheet as Figures 6 and 7, shows a third embodiment by a segment of annular cross-section a series of saddles different in form and securement to the tire, the segment shown as free of the roadway surface.

Figures 11 to 13 show an embodiment of my method and construction in which the entire tire width of the tread is in engagement with the roadway surface under all conditions of pressure, and in which—

Figure 11 is a transverse cross-section of the tire in engagement with the roadway surface under conditions of normal inflation pressure;

Figure 12 is a similar cross-section of the same tire under conditions of considerably decreased inflation pressure;

Figure 13 is an annular cross-section of a segment of the series of saddle devices utilized, the illustrated segment shown as free of the roadway surface; and Figure 14 is a detailed perspective of the form of saddle used in this embodiment, a form different from those preceding it.

Figure 15 is a segmental annular cross-section of a series of such saddles as shown in Figure 14 tied in to the carcass of the tire.

Figures 16, 17:
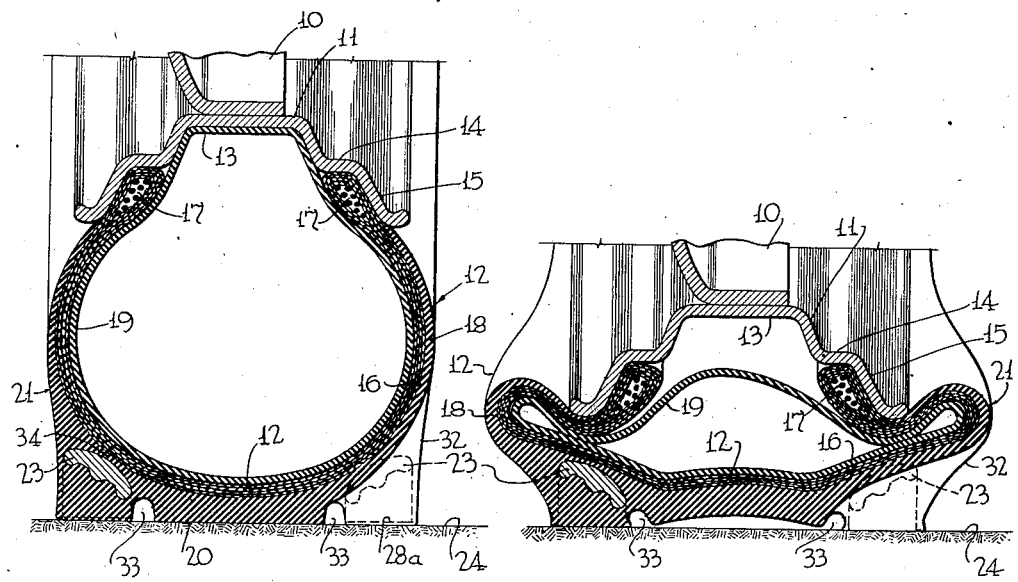

Figures 16 and 17 are another form of the embodiment of Figures 11 to 13, differing principally therefrom in the form of the saddles used, and the method of utilization of the form of saddle in its functioning to center the tire under flat tire conditions. Of them—

Figure 16 is a transverse cross-section under normal inflation pressure of that portion of the tire engaging the roadway; and Figure 17 is a cross-section of the same portion under flat tire conditions.

Figure 18:
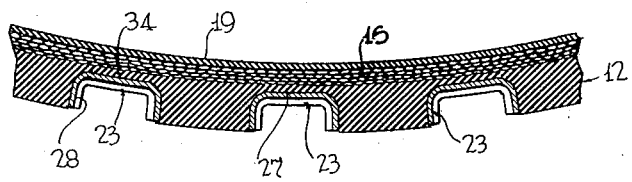

Figure 18 is an annular cross-section of a form of the device in which the saddles 23, instead of threading through the constituent buttes 26, are located between them and have their radially inner faces bonded to the rubber by a bond which is stronger than the rubber itself, by some of the well-known processes.

Throughout the drawings it will be attempted to give elements of corresponding function corresponding reference numerals, and to differentiate in the functionings and to aid in the differences in form and detail by applying different reference numerals.

The commonly known parts of the structures of the prior art having corresponding functionings are the wheel body 10 illustrated in Figure 1 as of the disc type, the wheel rim 11, and the pneumatic tire 12. The wheel rim 11 is illustrated as of the drop-center type having a drop-center or well portion 13, rim base portions 14, and tire-retaining flanges 15. The tire, which is comprised of a carcass 16 of fabric, cords or wires, is provided with beads 17 usually of wire and fabric to which the carcass is anchored, and a general outer covering 18 of rubber. The beads are seated on the bead seats 14. The usual inner tube is designated 19.

All those portions of the tire which engage the surface of the roadway are denominated generally the tread of the tire and are commonly designated 20, while the flanks of the tire between the tread 20 and the beads are denominated its side walls and are commonly designated 21. The rubber 18 covering the exterior of the tire is thin on the side walls 21, but is gradually thickened as it approaches the tread 20, and in the tread 20 is thickened very considerably to afford the tread a degree of wear consistent with the tire life.

In each of the several embodiments of my invention, I associate with the tread 20 a distance laterally of the plane of symmetry 22, an annular series of saddles 23 extending from the ground face of the tread generally radially of the tire at large and toward the carcass 12, and so located in position between the plane of symmetry of the tire 22 and its side walls 21, as to serve when they are engaged with the road surface 24 as fulcrums over which, when the tire is deflated below normal to such an extent that the side walls 21 extend to a materially greater extent than normally laterally of the tire beyond the saddles, a considerable part of that ground load which under normal inflation is carried by that portion of the tread 20 lying between the saddles 23 and the plane of symmetry 22, is imposed upon the saddles 23, and they are thus caused to grip upon or bite into the surface of the roadway to a considerably increased extent, thereby affording considerably increased traction.

This action is illustrated first in the comparison between Figures 1 and 2 showing the tire under normal inflation pressure, and Figures 4 and 5 showing the same tire under an inflation pressure reduced considerably below normal. The saddles 23, incorporated in the tread 20 of the tire and normally disengaged from the surface of the roadway 24, are not only rocked over to engage with the surface of the roadway 24, but as side walls 21 bulge laterally beyond the planes of the annular series of saddles 23 under the lowered inflation pressure, more and more of the actual ground load is transferred to them, the carcass 12 of the tire actually fulcruming over the tops of the saddles 23 and relieving those portions of the tread 20 lying inwardly thereof of a portion of their load.

The action is illustrated again in the embodiment of Figures 11 and 12 in which the saddles 23 normally engage the surface 24 of the roadway while the tire is under normal inflation pressure, but in which the ground load carried by saddles 23 is very considerably increased over and above the normal upon considerable deflation of the tire. Compare Figures 11 and 12 showing the one tire under normal inflation pressure and the other tire under pressure reduced considerably below normal.

The action is shown yet once again in the diagrams of Figures 6 and 7 which are similar except that those of Figure 6 show the action of the new tire under normal inflation and reduce the inflation, respectively, while the diagrams of Figure 7 show the same action in connection with an old tire in which the tread 20 has been worn down a depth designated 25. In these diagrams, to avoid confusion, the saddles 23 are represented by the buttes or buttresses 26 which contain them or which indeed may be so embodied as to constitute them. Full line diagrams represent the tire fully inflated under normal inflation pressure; the dotted line showings indicate the cross-section of the same tire under those moderate reductions of pressure which are occasioned by gradual leak-down, and from which the tire should be re-inflated before leakage goes further, and which moderate reductions in pressure do not considerably increase the load borne by the saddles 23 (buttes or buttresses 26); and the dash and dot line sections represent the disposition of the tire parts under those considerable reductions of inflation pressure, which do considerably increase the load born by the saddles 23 (or the buttes or buttresses 26), as previously illustrated in connection with the embodiments of Figures 1 to 4, and 11 and 12.

Finally the action is shown in the exaggerated situation of Figures 16 and 17, in which the fully inflated tire of Figure 16 is shown in Figure 17 as fully deflated, and absolutely all of the load is transferred to the saddles 23.

Considering now separately the several forms, the similarities and differences in their construcional detail will be described. Looking first at the embodiment of Figures 1 to 5, it will be seen that the saddles 23 are in the form of stamped sheet metal parts generally of U-form. They comprise top or seat portions 27, and side or end portions 28. The two portions 27 and 28 are joined together on smoothly curvilinear lines of greater or lesser abruptness. In this form, the top portion 27 itself is convexly curved toward the carcass 16 of the tire. In transverse cross-section, the saddles while flattish are ogee-shaped throughout to give them stiffness against bending under load, to provide greater mechanical interlocking with the rubber 18 of the tread, and to afford a greater surface area for vulcanizing to the rubber of the buttes 26. This ogee-shaped transverse cross-section in this form is convex at the side edges of the saddles, and concave in the middle, as viewed from its top surface presented toward the carcass 16 of the tire. The convex side edges prevent cutting of the rubber on the carcass under load. For the same reason, the extreme edges of the saddles are rounded throughout, as indicated at 27a. The extremities 28a are of plane form and sharp (especially after wearing) to enable them to grip or bite upon the surface of the roadway. The whole saddle 23, or the sides 28 only, may be hardened to increase resistance to wear, increase stiffness and improve grip and bite on the roadway. Steel is a good material of which to make them.

With the exception of the longitudinal and transverse cross-sectional form, these saddles 23 are similar in construction in each of the embodiments of Figures 11 to 14, of Figure 15, of Figure 10, and of Figures 16 and 17. In the embodiment of Figures 11 to 14, the longitudinal cross-section is not continuously curvilinear as in the instance of that of Figures 1 to 5, but both the top 27 and the sides 28 are rectilinear in their main bodies, being connected together by curved portions. Note particularly Figure 14 of perspective detail corresponding to Figure 3. Similarly in the form of Figure 15, the sides 28 are rectilinear, though the top 27 is curvilinear. Again in the form of Figure 10, both the top 27 and the sides 28 are rectilinear, being connected by portions of small curvature. In the forms of Figures 11 to 13, the flattish tranverse cross-section is continuously convex as presented toward the carcass 16 of the tire, while in the form of Figure 15 it is shown as generally concave presenting toward the carcass of the tire. In such case, the side edges may be convexed or well rounded as in the form of Figures 1 to 5. In the form of Figure 10, the transverse cross-section is flat as clearly appears. In the form of Figures 16 and 17, the transverse cross-section is generally convex toward the carcass 16 of the tire, though on its under side the saddle is provided with a corrugated surface. In this form, the saddle may be drop-forged or cast instead of stamped, since its cross-section is thickened and heavier. This form is also higher on the outside than the inside for a purpose to appear. The form of Figure 10 will also have this characteristic because its top lies in the body of the carcass.

In the form of Figures 8 and 9, the saddles 23 are divided into two parts, but the transverse cross-section is convex looking toward the carcass, and both the top 27 (in which the division is made) and the sides are generally rectilinear in form. Successive saddles of the series so divided are interconnected through the buttes 26 by tubular rivets 29.

These saddles 23 are each and all incorporated within or in connection with the buttes 26, and form constituent parts thereof. The saddles 23 have their outer surfaces throughout provided with an integral coating of brass, or with a coating of any one of those other well-known substances through which metal may be bonded to rubber with great strength through the vulcanizing process or otherwise. Many of these substances effect a bond between the metal and the rubber stronger than the bond between rubber and rubber. So bonded, there is no danger whatsoever that the saddles 23 may be dislodged from the rubber mass and thrown therefrom by centrifugal or other forces. In all of the forms of the invention, with the exception of that of Figures 8 and 9, the top 27 of the saddle extends annularly through the main body of the butte 26, and, therefore, has both its radially inner and radially outer surfaces so bonded to the body of the rubber. The tubular rivets 29 may be similarly bonded to the rubber body of the buttes 26. In this latter form in particular, however, the bonding of the saddles 23 and the rivets 29 may be omitted.

In both the forms of Figure 10 and Figure 15, the mechanical interlock of the saddles 23 with the rubber of the buttes due to its threading through the body of the rubber, is still further enhanced by a binder of cordage or fabric to the carcass of the tire. In the form of Figure 10, this is accomplished by interleaving the tops 27 of the saddles with the layers of cordage of the carcass 16, placing the top 27 between the inner and outer layers of cordage as clearly appears. In the form of Figure 15, it is accomplished by a special cordage or fabric tie 30 transversely looped under the top 27 of the saddle, and tying in to the carcass 16.

The annular series of rubber buttes 26 and their constituent saddles 23 are separated from each other by intervening spaces 31, and each butte is buttressed by bodies of rubber 32 to the side walls 21 of the tire. From this standpoint the buttes may be called buttresses to the side walls. The arrangement is such that when a substantial load is transferred to the saddles 23 and the buttes which bear them, causing them to grip a roadway surface covered with mud, snow, ice or the like, or bite thereinto, the displaced mud, snow or ice is not only mushed laterally of the tire, but mushed and forced up vertically through the intervened spaces 31 and freely passed upwardly of side walls 21 of the tire. With the spaces 31 opening freely laterally and vertically, there can be no solid packing or clogging which may reduce the prominence and penetrating capacity of the saddles 23 and buttes 26.

Intervened between the annular series of buttes 26 and constituent saddles 23 and the remaining portion of the tread 20 are furrows 33 which serve several functions. The one is to provide an inwardly located channel for the exiting of the mushed-out mud, snow or ice to the spaces 31 between the buttresses, thereby to enhance the action just described. Another function is to provide free space inwardly of the buttes 26 for the lateral inward flow of the rubber mass of the buttes, in the same manner that the unconfined outer sides of the buttes permit free lateral outward flow of the rubber of the buttes. This freedom of lateral flow of the rubber of the buttes is an important feature of my invention. The opposite ends of the buttes 26 are confined against substantial flow by the sides 28 of the saddles 23 which abut and are vulcanized to these portions of the buttes. It is intended that the sharp extremities 28a of the saddles grip or bite into the surface of the roadway and that the roadway-engaging faces of the buttes 26 give way sufficiently under the considerably increased pressure of load transfer to the saddles to render this action efficient. This giving-way of the rubber mass of the buttes 26 takes place laterally thereof, inwardly as well as outwardly. A third function of furrows 33 is to decrease the aggregate thickness of the tire wall in the region of the furrow and thereby to attain greater flexibility for the angular or rocking movement of the buttresses 26 under the substantially reduced inflation pressure, the more promptly and fully to bring them into contact with the surface of the roadway.

This improved flexibility enhances the readiness of accommodation of the tire walls in this region to tops of the saddles under reduced tire pressure conditions. This is further enhanced in all modifications except that of Figure 10, by spacing the tops 27 of the saddles from the carcass 16 through the intervened mass of rubber 34 which through lateral flow about the top of the saddles 27 increases the readiness of accommodation of the tire walls under the substantially increased loads. This intervened mass of rubber 34 also insures more thorough bonding together of saddles and carcass and minimizes the chances of wear or chafing of the carcass from the tops of the saddles when the load is thrown upon them.

Considering now more particularly the method involved and the operation of the invention, let us go back again particularly to the embodiment of Figures 1 to 5. This is a form of the invention in which the buttes 26 and saddles 23 under normal inflation pressure, as illustrated in Figures 1 and 2, do not contact the surface of the roadway. The engaging faces of the buttes 26 normally lie in the surfaces of cones intersecting the engaging plane of the tread. Encountering roadway conditions in which traction may be lost, most commonly snow and ice conditions (though it may be any of muddy, wet or greasy conditions) the motorist simply deflates the tire considerably, preferably to a pre-determined lower pressure, thereby moving the tire side walls 21 outwardly and rocking the buttes 26 and constituent saddles 23 angularly about the normally engaging portion of the tread 20, and into forced engagement with the surface of the roadway, as shown in Figures 4 and 5. This not only increases the width and length of the area of the tread engaging the roadway, as may be done with any tire, but it does something reaching far beyond this and for the first time introduced to the art by this invention. Because of the relative rigidity of the buttes 26 produced by the constituent metallic saddles 23 or their equivalent which serve as fulcrums over which the tire walls can be laid under the reduced pressure, and about which the load carried by the tire can be shifted, in proportion as the tire side walls are bulged outwardly as the pressure is reduced—the vehicle load carried by those portions of the tread 20 lying between the annular series of butes 26 and the plane of symmetry 22 is partialy shifted laterally outwardly and directly on to the buttes 26 and their constituent saddles 23, there to be concentrated. With the imposition of such substantial load, the rubber of the buttes 26 is flowed laterally in each direction, inwardly and outwardly, and the hardened metal extremities 28a of the saddles 23 grip and bite into the surface of the roadway to the extent necessary to afford the needed traction increase.

In this transfer of load from those portions of the tread 20 between the plane of symmetry 22 and the saddles 23 and buttes 26 to and over the tops of the saddles, the portions of the tread 20 lying between the buttes are actually relieved of a considerable portion of the load normally borne by them. They are relieved to such an extent as to shift to the buttes 26 and constituent saddles 23 from 20% to 60% of the ground load normally carried on those portions of the tread. This percentage of load transfer is readily adjustable by adjusting the degree of deflation below normal. The readiness with which this degree of load transfer may be attained, may be enhanced of course by properly adjusting in the initial design and construction of the tire, the relative dimensions and locations of the buttes 26 and constituent saddles 23 with respect to the remaining portion of the tread 20, and the relative location as respects the plane of symmetry 22 and the side walls 21, and other factors such as the extent and flexibility of the side walls 21. The walls of the tire in the region of the tops of the saddles 23, are swung over the tops of the saddles when the inflation pressure is considerably reduced, much in the same fashion as saddle bags are swung over the top of a riding saddle. As the side walls 21 are bulged out under the redistribution of the load with reduced pressure, the carcass in the side regions tenses the carcass portions in the tread region, and tends to draw it laterally over the top of the saddles in the furtherance of the relief of the central tread portions of their normal load. Thus the tire under normal inflation pressure whose cross-section is interiorly substantially continuously concave, as appears in Figure 1, becomes convexed of interior cross-section over the tops of the saddles 23, as appears in Figure 3.

Protection against side skidding is also afforded. In a side skid, the load is concentrated more upon the laterally outer corners of extremities 28a of the saddles on the side of the skid. They dig in and stop the skid. The saddles on the opposite side also aid in the same way. Normally, the edges of the saddles resist skid to a considerable degree, especially through the curvilinear cross-section of sides 28, but once the skid force is set up, there is this tendency to rock the saddles toward or upon the outer corners of extremities 28a.

I propose to provide motorists with pressure let-off gauges operating as do pressure-reducing valves, which gauges applied to the inflation valves through proper adaptors in the manner of ordinary pressure gauges, vent the tires until a pre-determined low pressure is reached, and thereupon cut off the vent and prevent further deflation. Such an instrument will insure quickness of conversion of tires from skid to non-skid conditions and absolute uniformity of conditions as between the several tires of a vehicle. Of even greater importance such an instrument insures deflation to precisely the proper pressure, preventing inexperienced motorists from deflating too little to secure results, or from deflating to such a high degree as to operate the tires under a pressure so low as to damage them. Such an instrument too prevents mis-judgment as between new and worn tires which commonly are found on one and the same vehicle.

The diagrams of Figure 7 indicate clearly that in certain embodiments of my invention at least the buttes 26 may be so disposed that they do not normally engage the surface of the roadway even when the tread of the tire is worn down substantially to the full intended degree. Under proper deflation the buttes 26 of the new tire even though normally considerably higher from the surface of the roadway than those of the old tire (a distance designated 25 as clearly appears from comparison of Figures 6 and 7), nevertheless are caused to engage the surface of the roadway as fully and effectively as in the instance of the worn tire. The embodiment of Figures 8 and 9 shows the tire in the condition of the new tire fully inflated, the buttes 26 and constituent saddles 23 being normally raised a distance 25 over the surface 24 of the roadway.

Referring now to the form of Figures 11 to 14 and again to the method and operation of my invention, in this embodiment the buttes 26 and constituent saddles 23 are in engagement with the roadway under the normal inflation pressure in which the interior cross-section of the tire is continuously convex. They normally carry a certain portion of the load of the tread 20, a portion not exceeding the same load per square inch as borne by the portion of the tread 20 lying between them. Preferably their transverse width and that of the buttes is about 20% of the width of the tread. Normally they will resist side skid as heretofore described.

Under these conditions, the metal of the extremities 28a of the saddles 23 will wear down more rapidly than the rubber of the buttes 26, and the rubber will, therefore, normally engage the roadway to a greater extent than the metal and govern the rate of wear. That principle upon which flexible shock-absorbing material resists wear under abrasion better than metal, is well known. It is commonly utilized in the art of sand-blasting of metal. The operator uses rubber gloves and handles the metal freely without injury to himself or a substantial wear of the gloves. The relatively thin transversely extending extremities 28a are quickly worn to a level slightly below the engaging faces of the buttes 26, as appears in Figure 11, and thus the roadway under normal operating conditions will not be unduly worn by the metal saddles. The laterally extending side walls 27 of the saddles are relatively thin, their transverse extent is not overly great, and their area but small compared with the area of buttes 26. Their embodiment in the rubber buttes 26 does not, therefore, materially alter the rate of wear of the rubber buttes, which rate of wear is the dominant factor under normal operation.

With such a construction, therefore, the rubber buttes 26 and the constituent saddles 23 may continuously take a load per square inch on the surface of the roadway substantially equal to the load per square inch taken by the remainder of the tread 20 without noticeable wear of the roadway and without any greater wear of the buttes 26 than that which is taken by the remainder of the tread 20. Nor are the riding qualities of the tire materially impaired, the relative area of the transverse metal end walls of the buttes constituted by the sides 28 of the saddles being so small as to minimize the number of shocks occasioned by the engagement of the extremities 28a with road surface irregularities such as small stones, and there being a sufficient mass of rubber 34 above the saddles 23 to shock-absorb such engagements. Inasmuch as the extremities 28a will normally be worn slightly below the faces of the buttes as shown exaggeratedly in Figure 11 (see also Figure 16), for great parts of the time they will not touch the surface of a good roadway such as a smooth asphalt or concrete roadway.

If at any time, however, it is desired to convert this tread of Figures 11 to 13 to a thorough-going non-skid tread, one has but to considerably reduce the inflation pressure below normal, whereupon, as clearly appears in Figure 12, the side walls 21 are bulged outwardly laterally beyond the tops of the saddles 23 and a considerable portion of the load formerly carried by the portion of the tread adjoining the plane of symmetry and between it and the annular series of saddles 23 is transferred to the annular series of saddles, the proportion being varied to the degree desired. Such load is in effect simply swung over the tops of the saddles. The rubber bodies of the buttes are flowed laterally (see the engaging faces of buttes 26 in Figures 12 and 17 as compared with Figures 11 and 16) and the extremities 28a grip and bite into the roadway as in the form of Figures 1 to 5.

The form of Figures 16 and 17, incident to the location of the medial plane of the annular series of saddles substantially coincident with the plane of the tops of the rim flanges, in addition to functioning as do embodiments already described, enables the vehicle to run considerable distances upon a flat tire. The outward folds of the flat side walls are compressed between the tops of the saddles and the rim flanges with such a distribution of the pressure over widened areas, and with such cushioning due to the mass of rubber 34 between the tops of the saddles and the carcass of the tire, as to avoid undue concentrations of pressure which might be damaging to the inner tube or to the tire walls. Yet further, due to the downward and inward inclination of the tops 27 of the saddles and the adjoining carcass 16 (the laterally outer portions being higher than the inner) when the saddles 23 are engaged with the roadway, the wheel rims are centered and maintained centered between the opposed inclinations of the annular series of saddles on opposite sides of the plane of symmetry. This effectually prevents transverse dragging of the walls of the inner tube upon each other and upon the carcass with resultant heavy load concentration and tearing. The dimensions and relative spacing of the saddles are such as to preclude undue shock as the rim rolls from one saddle to another. In fact, in this as in other forms of the invention illustrated, the saddles of a series on opposite sides of the plane of symmetry 22 are staggered in transverse relation to each other, the saddle on one side of the tire being transversely immediately opposite the intervened space 31 on the opposite side of the tire, still further smoothing the operation in all stages. (Note any of the transverse cross-section showings.)

Probably the most outstanding advantage of my invention resides in the attainment of the utmost facility in changing from skid to non-skid condition upon encountering slippery conditions in the roadway. Under conditions inviting skidding or wheel slipping, one has simply to reduce the tire pressure the substantial degree required to regain traction and to prevent skidding or slipping. As soon as the condition is cleared up, one has only to repair to the nearest gas station and reinflate his tires to normal. With such great facility, the present tremendous annoyances of tire chain attaching, of shock and vibration of chains when snow and ice are light, and of chain beat on stretches of roadway where snow and ice are absent; the disagreeable sensations of driving with chains over dry roadways, the wear and tear on chains and vehicles incident to keeping them on too long; and the expense of frequent repairs and renewals, etc., etc.—are one and all avoided. The tire is an all-year-round tire for all the wheels of the vehicle, providing improved wear and maximum comfort.

The tire may be most readily constructed, the saddles 23, after being appropriately treated to achieve the desired bond under vulcanization with the rubber body of the buttes 26 and the remainder of the tread, are appropriately supported in the tire mold along with the carcass 12 of the tire, and the vulcanizing process carried out as usual. The mold itself, of course, will be provided with appropriate means to support the saddles in their proper locations with regard to the carcass 12. Such means may conveniently consist of radially inwardly extending projections from the inner face of the mold which engage with and support the sides 28 of the saddles in the spaces 31 between the buttes 26. These projections can effectively be made extensible and retractable so that they may be retracted through the body of the mold by appropriate mechanism when the mold is to be separated and the tire removed.

Many modifications of my invention are possible. I would say that the modifications possible are really innumerable. All of them which fall within the generic spirit of my invention should assuredly be covered by the annexed claims, irrespective of the circumstantial terminology which I use in my attempt to define my invention.

What I claim is:

1. In a tire a non-skid tread zone embodying an annular series of metal anti-skid members which when the tire is in place on a wheel lie substantially in the planes of the rim flanges of such wheel which members have tops which when the tire is flat and the side walls collapse upon each other at the roadway converge downwardly and inwardly sharply toward the medial plane of the tire whereby automatic centering of the tread with respect to the wheel rim takes place when the tire in use becomes flat.

2. A pneumatic tire comprising a flexible carcass and a tread of elastic material, the outermost zones of said tread being of a width relatively narrow as compared with the width of tread between them, and having embedded therein metallic reinforcements against roadway reaction and under such reaction being substantially non-deflectible tangentially of those portions of the carcass which bear them, and the tread intermediate said outermost zones being free of such reinforcements, and the carcass having a transverse cross-section which when the section is collapsed by roadway reaction under subnormal yet continuously permissible tire operating air pressures may assume widths greater than that of the tread by those amounts which impose upon said reaction reinforced outermost zones gross reaction loadings preponderating over those then carried by the tread intermediate said zones.

3. A tire according to claim 2 in which said outermost zones are comprised of annularly separated buttes having heads which form the tread surfaces of said outer most zones and main bodies buttressing the heads vertically to the side walls of the tire, which buttes are provided in part and at least on their adjacent sides with metal facings reaching to their heads.

4. A tire according to claim 2 in which the metallic reinforcements comprise U-shaped metal saddles whose bights are open on both sides, which saddles lie toward and substantially contiguous to the carcass of the tire, and in each outermost zone extend in the general plane of the zone, and whose legs extend to the tread face of the zone and are of a cross-section thin annularly of the zone but wide laterally thereof.

5. A tire according to claim 2 in which the tread face of each of the outermost zones lies substantially in the surface of a cone and is, under the reaction loading of normal inflation pressure, substantially wholly out of contact with the surface of the road, and which cone intersects the road surface substantially at the margin of contact of the intermediate tread portion with the road surface.

6. A tire according to claim 2, in which said outermost zones are comprised of annularly separated buttes having heads which form the tread surface thereof and main bodies buttressing the heads vertically to the side walls of the tire, and in which the heads of the buttes are separated from the tread intermediate the said zones by a furrow of substantial depth.

JOHN P. TARBOX.